US012164517B2

(12) United States Patent
Porwal et al.

(10) Patent No.: US 12,164,517 B2
(45) Date of Patent: Dec. 10, 2024

(54) APPROXIMATE QUERY PROCESSING FOR JOIN QUERIES

(71) Applicant: Adobe Inc., San Jose, CA (US)

(72) Inventors: Vibhor Porwal, Bangalore (IN); Yeuk-Yin Chan, Santa Clara, CA (US); Vidit Bhatia, Modinagar (IN); Subrata Mitra, Bangalore (IN); Shaddy Garg, Bangalore (IN); Sergey N Kazarin, Danville, CA (US); Sameeksha Arora, Issaquah, WA (US); Himanshu Panday, Noida (IN); Gautam Pratap Kowshik, El Cerrito, CA (US); Fan Du, Milpitas, CA (US); Anup Bandigadi Rao, San Jose, CA (US); Anil Malkani, Fremont, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/092,779

(22) Filed: Jan. 3, 2023

(65) Prior Publication Data

US 2024/0220502 A1 Jul. 4, 2024

(51) Int. Cl.
*G06F 16/245* (2019.01)
*G06F 16/2453* (2019.01)
*G06F 16/2458* (2019.01)

(52) U.S. Cl.
CPC .... *G06F 16/24544* (2019.01); *G06F 16/2462* (2019.01)

(58) Field of Classification Search
CPC ............ G06F 16/24544; G06F 16/2462
See application file for complete search history.

(56) References Cited

U.S. PATENT DOCUMENTS

| 6,865,567 | B1 * | 3/2005 | Oommen | G06F 16/24542 |
| 10,558,663 | B2 * | 2/2020 | Bestfleisch | G06F 16/24552 |
| 11,086,868 | B2 * | 8/2021 | Ahmed | G06F 16/24539 |
| 11,803,545 | B1 * | 10/2023 | Chong | G06F 16/24549 |

(Continued)

OTHER PUBLICATIONS

Huang et al., "Joins on Samples: A Theoretical Guide for Practitioners", Proceedings of the VLDB Endowment, vol. 13, No. 4, pp. 547-560 (Year: 2019).*
Li et al., "Approximate Query Processing: What is New and Where to Go?", Data Science and Engineering, vol. 3, pp. 379-397 (Year: 2018).*
Le Quoc et al., "Approxjoin: Approximate Distributed Joins", In Proceedings of the ACM Symposium on Cloud Computer, SoCC, Association for Computing Machinery, pp. 426-438 (Year: 2018).*

(Continued)

*Primary Examiner* — Hosain T Alam
*Assistant Examiner* — Robert F May
(74) *Attorney, Agent, or Firm* — Shook, Hardy & Bacon L.L.P.

(57) ABSTRACT

To retrieve information derived from a plurality of separately stored datasets, join structures are identified within the plurality of separately stored datasets. Join structures can include datasets joined by a central dataset, datasets joined by a single key, and datasets joined across a plurality of keys. Each of the join structures corresponds to a query processing schema that defines a sampling technique. When a join query is received as a SQL query, the join query identifies a portion of the plurality of separately stored datasets, from which a join structure is selected and a corresponding query processing schema is identified. The join query is reconstructed to form a reconstructed join query that comprises query processing schema instructions to derive the requested information using the sampling technique defined by the identified query processing schema.

20 Claims, 10 Drawing Sheets

(56) References Cited

U.S. PATENT DOCUMENTS

| | | | |
|---|---|---|---|
| 2003/0018615 A1* | 1/2003 | Chaudhuri | G06F 16/2462 |
| 2003/0084043 A1* | 5/2003 | Acharya | G06F 16/2462 |
| | | | 707/999.005 |
| 2004/0249810 A1* | 12/2004 | Das | G06F 16/2462 |
| | | | 707/999.005 |
| 2008/0104089 A1* | 5/2008 | Pragada | G06F 16/2471 |
| | | | 707/E17.135 |
| 2008/0288446 A1* | 11/2008 | Hu | G06F 16/2462 |
| 2010/0114869 A1* | 5/2010 | Deolalikar | G06F 16/24524 |
| | | | 707/718 |
| 2013/0191650 A1* | 7/2013 | Balakrishnan | G06F 21/6227 |
| | | | 713/190 |
| 2014/0310260 A1* | 10/2014 | Wu | G06F 16/245 |
| | | | 707/718 |
| 2017/0228425 A1* | 8/2017 | Kandula | G06F 16/24542 |
| 2018/0046550 A1* | 2/2018 | Chang | G06F 16/24544 |
| 2018/0181542 A1* | 6/2018 | Nica | G06F 17/18 |
| 2020/0286011 A1* | 9/2020 | Meng | G06F 16/242 |
| 2021/0271656 A1* | 9/2021 | Hertzschuch | G06F 17/18 |
| 2022/0164346 A1* | 5/2022 | Mitra | G06N 7/01 |
| 2023/0153304 A1* | 5/2023 | Dong | G06F 16/2456 |
| | | | 707/714 |

OTHER PUBLICATIONS

Acharya et al., "Join synopses for approximate query answering", ACM SIGMOD Record, vol. 28, Issue 2, pp. 275-286 (Year: 1999).*

Huang, D., et al., "Joins on Samples: A Theoretical Guide for Practitioners", Proceedings of the VLDB Endowment, vol. 13, No. 4, pp. 547-560 (2019).

Li, K., and Li, G., "Approximate Query Processing: What is New and Where to Go?", Data Science and Engineering, vol. 3, pp. 379-397 (2018).

Liu, Z., and Heer, J., "The Effects of Interactive Latency on Exploratory Visual Analysis", IEEE Transactions on Visualization and Computer Graphics, pp. 1-10 (2014).

Quoc, D. L., "Approxjoin: Approximate Distributed Joins", In Proceedings of the ACM Symposium on Cloud Computing, SoCC, Association for Computing Machinery, pp. 426-438 (2018).

Simonyan, K., and Zisserman, A., "Very Deep Convolutional Networks for Large-Scale Image Recognition", arXiv:1409.1556v6, pp. 1-14 (Apr. 10, 2015).

Vengerov, D., et al., "Join Size Estimation Subject to Filter Conditions", Proceedings of the VLDB Endowment, vol. 8, No. 12, pp. 1530-1541 (2015).

* cited by examiner

212

| Zip Code ▾ | Median Home Value ▾ | Median Household Income ▾ | Population Density ▾ |
|---|---|---|---|
| 64113 | $305,800 | $113,536 | 4,541 |
| 66208 | $213,000 | $83,860 | 3,223 |
| 66206 | $330,900 | $103,533 | 2,453 |
| 66205 | $179,400 | $78,648 | 3,520 |
| 66211 | $520,500 | $77,813 | 961 |
| ⋮ | ⋮ | ⋮ | ⋮ |

| Customer ID ▾ | Zip Code ▾ | Gender ▾ | Purchase Frequency (1-5) ▾ |
|---|---|---|---|
| 2541 | 64131 | F | 4 |
| 3652 | 64145 | F | 3 |
| 9514 | 66206 | M | 1 |
| 7489 | 66204 | F | 4 |
| 3691 | 64113 | M | 2 |
| ⋮ | ⋮ | ⋮ | ⋮ |

| Customer ID ▾ | Subscription Start Year ▾ | Subscription End Year ▾ |
|---|---|---|
| 9514 | 2018 | 2018 |
| 3691 | 2022 | 0 |
| 8521 | 2021 | 0 |
| 6647 | 2007 | 2013 |
| 4955 | 2019 | 0 |
| ⋮ | ⋮ | ⋮ |

| Join Query | Query Processing Schema | Reconstructed Join Query |
|---|---|---|
| SELECT COUNT(*) AS countEst, C FROM Fact INNER JOIN $Dim_1$ ON $Fact.C_1 = Dim_1.C_1$ INNER JOIN $Dim_2$ ON $Dim_2.C2 = Fact.C_2$ INNER JOIN ... INNER JOIN $Dim_n$ ON $Dim_n.C_j = Fact.C_j$ WHERE c GROUP BY C; | Fact Dimension JOIN | SELECT SUM(1/S.SR) AS countEst, C FROM S INNER JOIN $Dim_1$ ON $S.C_1 = Dim_1.C_1$ INNER JOIN $Dim_2$ ON $Dim_2.C_2 = S.C_2$ INNER JOIN ... INNER JOIN $Dim_n$ ON $Dim_n.C_j = S.C_j$ WHERE c GROUP BY C; |
| SELECT COUNT(*) AS countEst, C FROM $T_1$ INNER JOIN $T_2$ ON $T_1.C_1 = T_2.C_1$ INNER JOIN $T_3$ ON $T_3.C_1 = T_1.C_1$ INNER JOIN ... INNER JOIN $T_n$ ON $T_n.C_i = T_j.C_1$ WHERE c GROUP BY C; | Single Key JOIN | SELECT SUM(1/ ((S1.SR S2.SR * ... * Sn.SR) * LEAST (S1.USR, S2.USR, ..., Sn.USR))) AS countEst, C FROM $S_1$ INNER JOIN $S_2$ ON $S_1.C_1 = S_2.C_1$ INNER JOIN $S_3$ ON $S_3.C_1 = S_1.C_1$ INNER JOIN ... INNER JOIN $S_n$ ON $S_n.C_i = S_j.C_1$ WHERE c GROUP BY C; |
| SELECT COUNT(*) AS countEst, C FROM $T_1$ INNER JOIN $T_2$ ON $T_1.C_1 = T_2.C_1$ INNER JOIN $T_3$ ON $T_3.C_2 = T_1.C_2$ INNER JOIN ... INNER JOIN $T_n$ ON $T_n.C_i = T_j.C_i$ WHERE c GROUP BY C; | Multiple Key JOIN | SELECT SUM(1/ (S1.SR * S2.SR * ... * Sn.SR)) AS countEst, C FROM $S_1$ INNER JOIN $S_2$ ON $S_1.C_1 = S_2.C_1$ INNER JOIN $S_3$ ON $S_3.C_2 = S_1.C_2$ INNER JOIN ... INNER JOIN $S_n$ ON $S_n.C_i = S_j.C_i$ WHERE c GROUP BY C; |

FIG. 6

| Join Query | Query Processing Schema | Reconstructed Join Query with Confidence Interval (CI) |
|---|---|---|
| 702 — SELECT COUNT(*) AS countEst, C FROM Fact INNER JOIN $Dim_1$ ON $Fact.C_1 = Dim_1.C_1$ INNER JOIN $Dim_2$ ON $Dim_2.C_2 = Fact.C_2$ INNER JOIN ... INNER JOIN $Dim_n$ ON $Dim_n.C_j = Fact.C_j$ WHERE c GROUP BY C; | Fact Dimension JOIN | 704 — SELECT countEst, (countEst +2 * SQRT(varCount)) AS countUB, GREATEST (0, countEst -2 SQRT(varCount)) AS countLB, C FROM (SELECT SUM(1/S.SR) AS countEst, SUM((1 - S.SR)/(S.SR * S.SR)) AS varCount, C FROM S INNER JOIN $Dim_1$ ON $S.C_1 = Dim_1.C_1$ INNER JOIN $Dim_2$ ON $Dim_2.C_2 = S.C_2$ INNER JOIN ... INNER JOIN $Dim_n$ ON $Dim_n.C_j = S.C_j$ WHERE c GROUP BY C); |
| 706 — SELECT COUNT(*) AS countEst, C FROM $T_1$ INNER JOIN $T_2$ ON $T_1.C_1 = T_2.C_1$ INNER JOIN $T_3$ ON $T_3.C_1 = T_1.C_1$ INNER JOIN ... INNER JOIN $T_n$ ON $T_n.C_i = T_j.C_1$ WHERE c GROUP BY C; | Single Key JOIN | 708 — SELECT countEst, (countEst +2 * SQRT(varCount)) AS countUB, GREATEST (0, countEst -2 * SQRT(varCount)) AS countLB, C FROM (SELECT SUM(1/((S1.SR * S2.SR * ... * Sn.SR) * LEAST (S1USR, S2.USR, ..., Sn.USR))) AS countEst, SUM((1 - (S1.SB * S2.SB * ... * Sn.SB))/((S1.SB * S2.SB * ... * Sn.SB)) * (S1.SB * S2.SB * ... * Sn.SB))) AS varCount, C FROM $S_1$ INNER JOIN $S_2$ ON $S_1.C_1 = S_2.C_1$ INNER JOIN $S_3$ ON $S_3.C_1 = S_1.C_1$ INNER JOIN ... INNER JOIN $S_n$ ON $S_n.C_1 = S_j.C_1$ WHERE c GROUP BY C); |
| 710 — SELECT COUNT(*) AS countEst, C FROM $T_1$ INNER JOIN $T_2$ ON $T_1.C_1 = T_2.C_1$ INNER JOIN $T_3$ ON $T_3.C_2 = T_1.C_2$ INNER JOIN ... INNER JOIN $T_n$ ON $T_n.C_i = T_j.C_i$ WHERE c GROUP BY C; | Multiple Key JOIN | 712 — SELECT countEst, (countEst +2 SQRT(varCount)) AS counUB, GREATEST (0, countEst -2 * SQRT(varCount)) AS countLB, C FROM (SELECT SUM(1/(S1.SR * S2.SR * ... * Sn.SR)) AS countEst, SUM((1 - (S1.SR * S2.SR * ... * Sn.SR) * ... * Sn.SR))/((S1.SR * S2.SR * ... * Sn.SR) * (S1.SR * S2.SR * ... * Sn.SR))) AS varCount, C FROM $S_1$ INNER JOIN $S_2$ ON $S_1.C_1 = S_2.C_1$ INNER JOIN $S_3$ ON $S_3.C_2 = S_1C_2$ INNER JOIN ... INNER JOIN $S_n$ ON $S_n.C_i = S_j.C_i$ WHERE c GROUP BY C); |

FIG. 7

APPROXIMATE QUERY PROCESSING FOR JOIN QUERIES

BACKGROUND

Databases store datasets of information. Computing devices can retrieve information from datasets by generating and sending queries. The queries are generated using database query languages (DQLs). A server receives the query and executes the query to retrieve the information from a database. The retrieved information is then sent back to the requesting computing device.

SUMMARY

At a high level, the technology generally relates to retrieving information from a database using approximate query processing for join queries. More specifically, a join query is generated and sent by a computing device to retrieve information from a server. The join query requests derivative information determined from more than one dataset that are joined to derive the information.

A join structure is determined for the datasets. The join structure is based on how the datasets are joined at certain keys, e.g., rows or columns of data. Various join structures may be determined for datasets based on how the datasets can be joined using the data stored within to derive information, such as if datasets have common keys. Using the join structure, a query processing schema is selected. The query processing schema defines a sampling technique, which determines how to sample the data within the datasets to derive the information. The sampling techniques instruct which datasets to sample, and how to sample the datasets.

The join query is reconstructed into a reconstructed join query, which includes query processing schema instructions that are determined by the query processing schema and provide instructions for sampling the datasets in accordance with the sampling technique. The sampling technique is employed by the server to derive the requested information from the datasets and provide it to the requesting computing device.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIGS. 2A-2C are example datasets that can be joined and from which information can be derived using aspects of the described technology, in accordance with aspects described herein;

FIG. 6 illustrates an example reconstructed join query, in accordance with an aspect described herein;

FIG. 7 illustrates another example reconstructed join query, in accordance with an aspect described herein;

DETAILED DESCRIPTION

Figure 1:
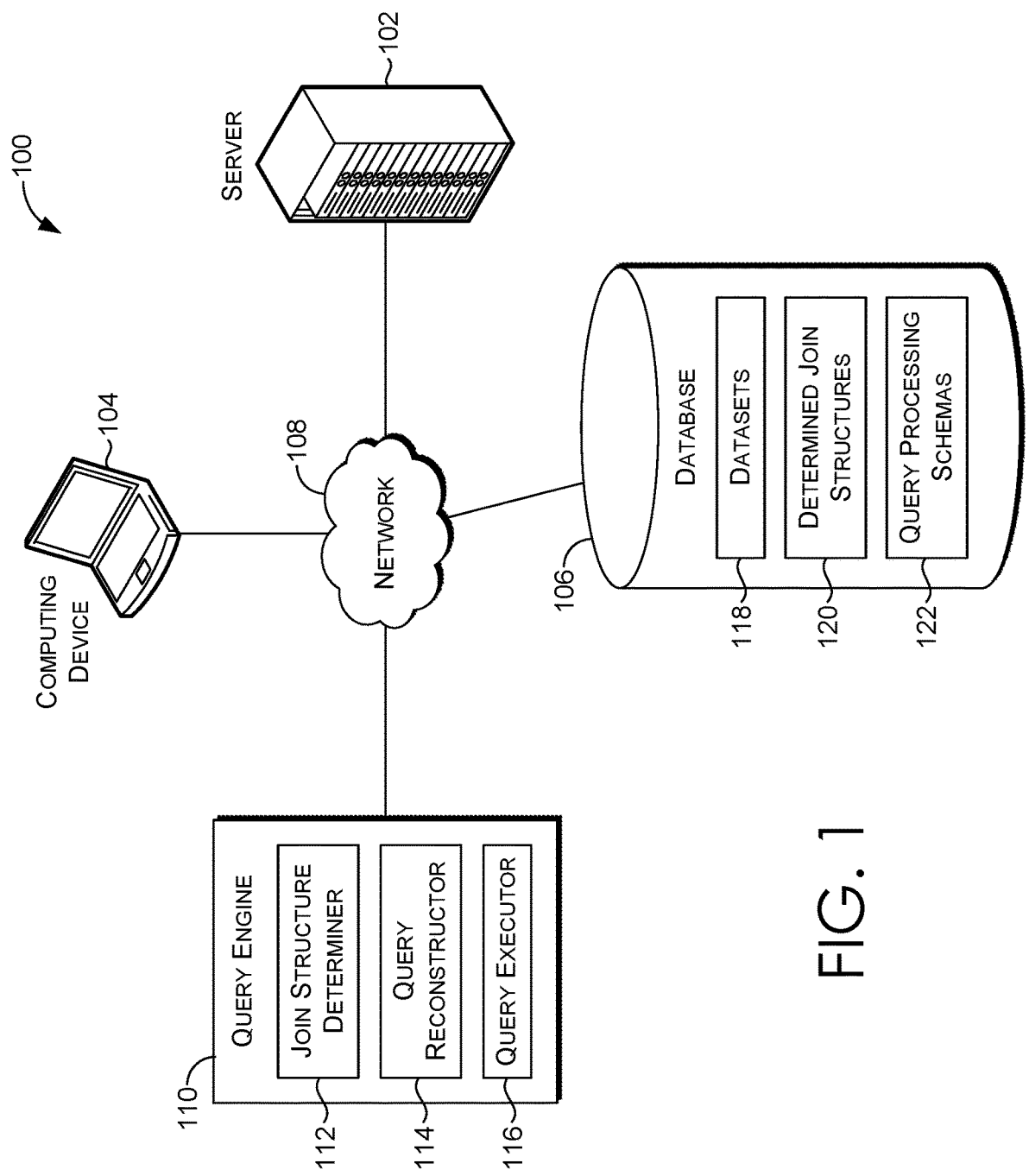
FIG. 1 is an example operating environment in which aspects of the technology may be employed, in accordance with an aspect described herein.

In general, join queries can be computationally expensive, depending on the datasets from which information is to be retrieved. A join query in database retrieval generally comprises a request, in a database query language (sometimes referred to as "DQL"), to join more than one separately stored dataset. For example, a dataset may comprise information that allows one dataset to be at least partly combined with another dataset to determine derivative information from the joined datasets.

However, based on the size of the joined datasets, the request for the derivative information may require significant computational resources to derive it. For instance, some datasets can be hundreds of thousands or more of data points, and the amount of data used to derive the requested information may exponentially grow when joining multiple datasets. Processing these large datasets requires more and more computer processing resources, as the number of databases and how they are joined increases.

To alleviate some of these problems and reduce the computational loads required to process these large joined datasets, approximation techniques can be used. In general, an approximation technique samples a dataset to derive information from a portion of the dataset, thereby reducing the number of computational events. For instance, a dataset comprising one million data points may be sampled so that 1 of every 10 data points is used to derive the requested information. In this scenario, the number of computational events has been reduced by 90%, thereby reducing the computational load on the server executing the query.

Join queries, however, provide some additional challenges. In particular, the computing device submitting the query may not supply instructions for how to sample multiple datasets after joining. Also, in some instances, the computing device submitting the join query may not have an understanding of the structure of the final joined dataset. As such, if providing sampling instructions at all, it may not provide the best or most efficient instructions for sampling the joined datasets.

Thus, it may be beneficial to reconstruct a join query so that the reconstructed join query includes a sampling technique that reduces the computational load by the server executing the query to derive information from the joined datasets. By reconstructing the join query, join queries can be processed in more efficient manners, and the derived information can be provided back to the requesting computing device. In many cases, the information derived using the approximation sampling techniques on the joined datasets is a suitable response to the initial join query, yet requires significantly less computational resources to retrieve. This ultimately allows a server that is being used for database recall to process more queries in a more efficient manner.

One example method to achieve these benefits includes determining join structures for a plurality of separately stored datasets. Separately stored datasets include datasets that have at least some different information between the datasets. Separately stored datasets may be stored on a single database, such as different files, or may be distributed across a plurality of databases. Join structures represent how the datasets may be joined and are determined based on the information from the dataset.

A join structure that may be determined from the plurality of separately stored datasets includes a fact dimension join, which includes a centrally joined dataset. Another includes a single key join, which comprises datasets joined by one key, such as a column or row of information. Another join structure includes a multiple key join, which comprises datasets joined by two or more keys.

Each of the join structures is associated with a query processing schema that defines a sampling technique. The sampling technique generally instructs which of the datasets is sampled and how to sample the datasets. For instance, the fact dimension join is associated with a first query processing schema, and the first sampling technique defined by the first query processing schema instructs sampling only the centrally joined dataset. That is, the centrally joined dataset is sampled according to a sampling rate, while the peripheral datasets are not sampled. As another example, the single key join is associated with a second query processing schema, and the second sampling technique defined by the second query processing schema instructs sampling each of the joined datasets according to a calculated sampling rate, which may the same or different between datasets. Yet another example includes the multiple key join being associated with a third query processing schema, where the third sampling technique defined by the third query processing schema instructs constructing join structure fragments from the multiple key join, where the join structure fragments comprise single key joins, which are then respectively sampled according to the sampling technique for the single key joins.

By predetermining join structures, when a join query is received, the join query can be reconstructed into a reconstructed join query that includes query processing schema instructions to derive information according to the sampling technique. That is, the join structure is determined from the received join query, which identifies the data or datasets that are used to derive the information requested. Based on the join structure a corresponding query processing schema is selected. As noted, the query processing schema defines the sampling technique. The join query is reconstructed to include query processing schema instructions in accordance with the sampling technique. The query processing schema instructions include query elements that derive the requested information by identifying the datasets and how to sample the datasets using a sampling rate.

The reconstructed join query is then employed to derive the requested information from one or more databases. Once the information has been derived, the requested information is provided to a computing device from which it received the join query.

It will be realized that the method previously described is only an example that can be practiced from the description that follows, and it is provided to more easily understand the technology and recognize its benefits. Additional examples are now described with reference to the figures.

With reference now to FIG. 1, an example operating environment 100 in which aspects of the technology may be employed is provided. Among other components or engines not shown, operating environment 100 comprises server 102, computing device 104, and database 106, which are communicating via network 108.

Database 106 generally stores information including data, computer instructions (e.g., software program instructions, routines, or services), or models used in embodiments of the described technologies. Although depicted as a single database component, database 106 may be embodied as one or more databases or may be in the cloud.

Network 108 may include one or more networks (e.g., public network or virtual private network "VPN") as shown with network 108. Network 108 may include, without limitation, one or more local area networks (LANs) wide area networks (WANs), or any other communication network or method.

Generally, server 102 is a computing device that implements functional aspects of operating environment 100, such as one or more functions of query engine 110, to facilitate retrieving information from joined datasets. One suitable example of a computing device that can be employed as server 102 is described as computing device 1100 with respect to FIG. 11. In implementations, server 102 represents a back-end or server-side device.

Computing device 104 is generally a computing device that may be used to send join queries and receive information requested by the join queries. One suitable example of a computing device that can be employed as computing device 104 is described as computing device 1100 with respect to FIG. 11. In implementations, computing device 104 is a client-side or front-end device. In addition to server 102, computing device 104 may implement functional aspects of operating environment 100, such as one or more functions of query engine 110, to retrieve information from joined datasets. It will be understood that some implementations of the technology will comprise either a client-side or front-end computing device, a back-end or server-side computing device, or both executing any combination of functions from query engine 110, among other functions, to retrieve information from joined datasets using sampling techniques.

As noted, computing device 104 may send a join query to server 102 via network 108. Server 102 may employ query engine 110 to retrieve and provide the information requested in the received join query back to computing device 104. In general, query engine 110 facilitates reconstructing join queries and executing reconstructed join queries to derive requested information using sampling techniques, and provide the requested information in response to receiving the join query from computing device 104.

In general, a join query generally requests information be derived from a plurality of separately stored datasets, such as datasets 118. The information is derived by joining the datasets at one or more keys, e.g., columns, rows, or other like data arrangement element. While data within datasets may be joined in several manners, one specific manner is joining datasets at a common key, meaning joining the datasets using data common to the datasets.

FIGS. 2A-2C provide an example illustration of a plurality of separately stored datasets. Here, the plurality of separately stored datasets comprises first dataset 202, second dataset 204, and third dataset 206. As an example, first dataset 202 comprises rows 208 and columns 210, each of which are example keys for first dataset 202 that may be used to join with other datasets, such as second dataset 204 and third dataset 206.

As noted, one method on which datasets may be joined uses common keys, which is a data arrangement element, such as any of rows 208 or columns 210, that has data common between the datasets. Using the example provided by FIGS. 2A-2C, first key 212 of first dataset 202 is common with second key 214 of second dataset 204, as each comprises zip code information. As such, first dataset 202 and second dataset 204 could be joined using first key 212 and second key 214 since they are common. Likewise, another example common key is illustrated between third key 216 of second dataset 204 and fourth key 218 of third dataset 206. As such, second dataset 204 and third dataset 206 could be joined using these keys. By joining the datasets, derivative information can be determined and retrieved. While an example aspect in which datasets are joined using common keys is presented and described, more broadly, it will be understood that datasets may be joined using other types of related information, where one key can be identified as corresponding to another key in a separate dataset based on the relationship between the information within the datasets.

With reference back to FIG. 1, in one aspect of the technology, a determination of how datasets 118 can be joined is made during an off-line process prior to receiving the join query from computing device 104. In another aspect, the determination of how the data sets are joined is made at runtime in response to receiving the join query. Join structure determiner 112 of query engine 110 may be employed to determine join structures that are formed when joining the datasets together in some manner. In some cases, various combinations of join structures for datasets 118 may be determined. Join structure determiner 112 generally identifies common keys or other data relationships between datasets of datasets 118, thus indicating how a plurality of separately stored datasets within datasets 118 can be joined, thereby identifying the join structure for the plurality of separately stored datasets.

Figure 3:
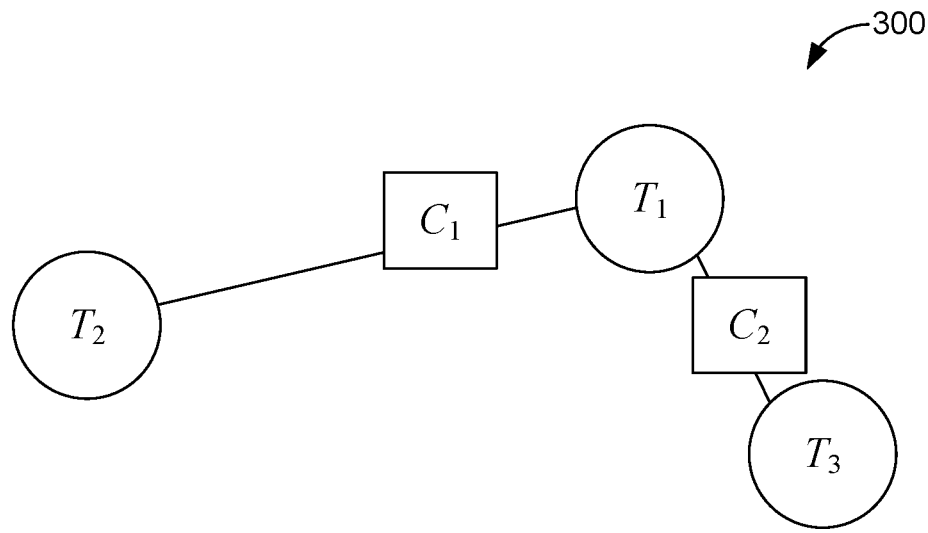
FIG. 3 illustrates an example first join structure, in accordance with an aspect described herein.
Figure 4:
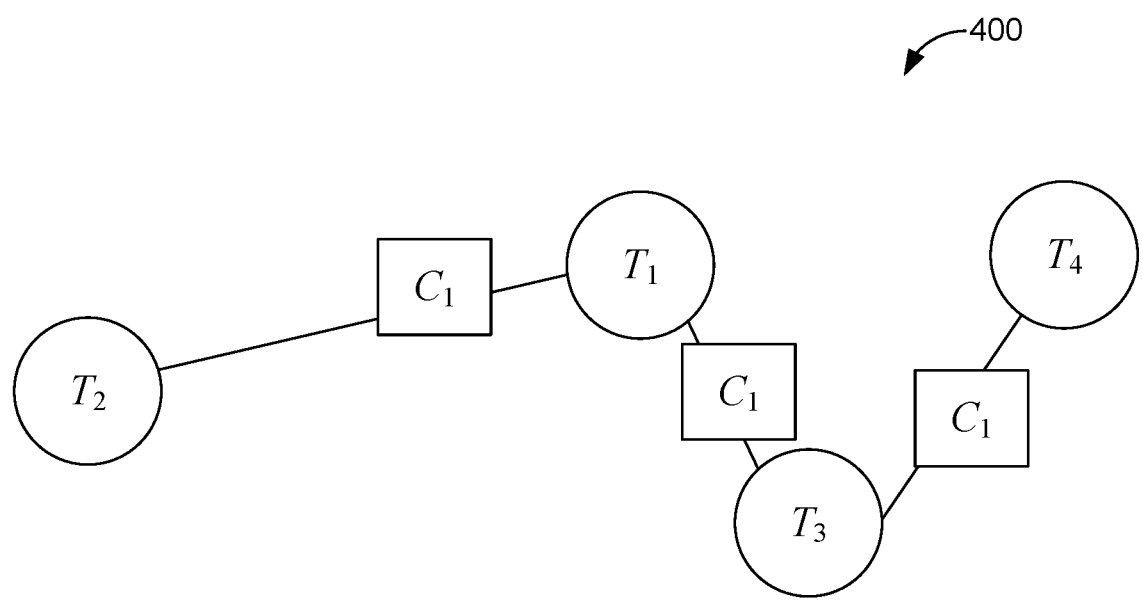
FIG. 4 illustrates an example second join structure, in accordance with an aspect described herein.
Figure 5A:
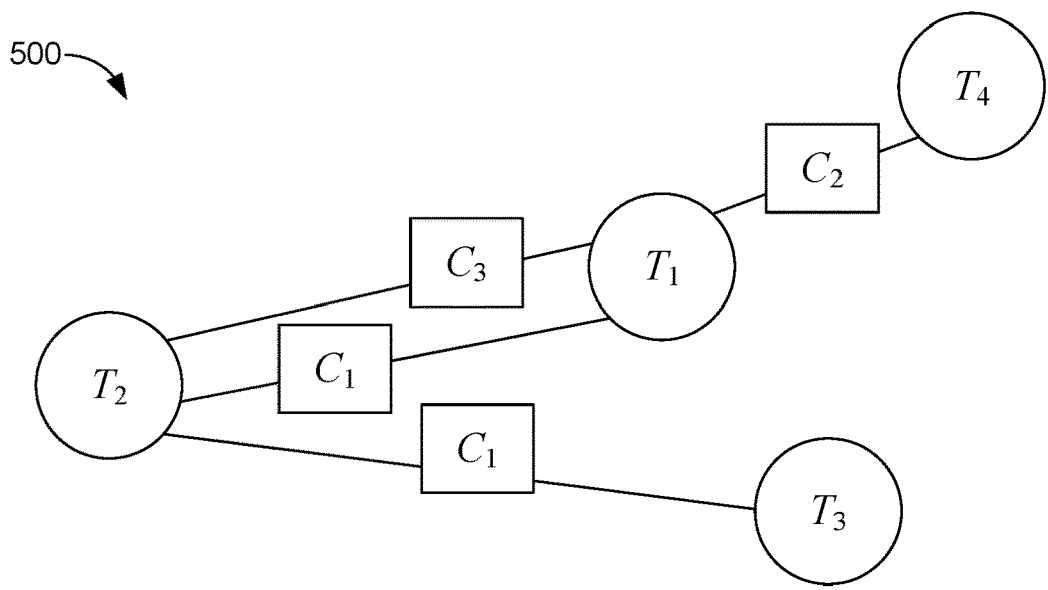
FIG. 5A illustrates an example third join structure, in accordance with an aspect described herein.

FIG. 3, FIG. 4, and FIG. 5A provide some graphical illustrations showing how various datasets (T) may be joined at various keys, illustrated as columns (C) in these examples. For brevity and clarity, the joins in these examples are illustrated as occurring at a column, but it will be understood that the datasets could be joined at any related data element. Moreover, the datasets are illustrated as T for "table," but it will also be understood that datasets may be in other data structures as well.

Join structure determiner 112 may determine different types of join structures when joining datasets 118 in various arrangements. Some examples include a fact dimension join, a single key join, and a multiple key join, among others.

FIG. 3 illustrates a representation of a fact dimension join, illustrated here as first join structure 300. In general, a fact dimension join comprises at least one centrally joined dataset. The centrally joined dataset may be joined to peripheral datasets by one or more keys. In FIG. 3, $T_1$ can be joined at $T_2$ at $C_1$, and also joined to $T_3$ at $C_2$. Thus, $T_1$ is the centrally joined dataset, while $T_2$ and $T_3$ are peripheral datasets. In some instances, the centrally joined dataset is also referred to as the fact dataset, while the peripheral datasets may be referred to as dimension datasets.

FIG. 4 illustrates a representation of a single key join, illustrated here as second join structure 400. In general, a single key join may comprise two or more datasets joined by a single key. In the illustrated example, $T_1$, $T_2$, $T_3$, and $T_4$, are each joined at $C_1$. Since each are joined at $C_1$, $C_1$ is the single key in this example.

FIG. 5A illustrates a representation of a multiple key join, illustrated here as third join structure 500. A multiple key join may comprise two or more datasets joined by two or more keys. In some instances, a multiple key join structure does not have a single centrally joined dataset. In the illustrated example, $T_1$ is joined with $T_2$ at both $C_1$ and $C_3$. $T_2$ is also joined with $T_3$ at $C_1$, and $T_1$ is also joined with $T_4$ at $C_2$.

Using join structure determiner 112, the join structure for a multiple key join may be divided to construct a plurality of join structure fragments. The join structure fragments may include two or more datasets that are included in the multiple key join and indicate which keys these datasets are joined at. For instance, join structure determiner 112 may identify one or more single key joins from the multiple key join. This may be done by identifying datasets from the join structure of the multiple key join that are joined by only one key.

Figure 5B:
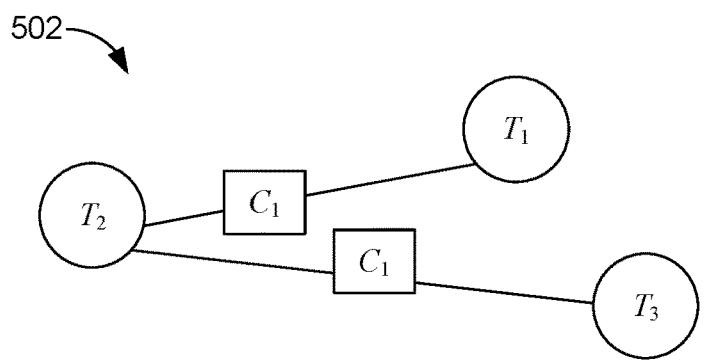
FIGS. 5B-5D illustrate example join structure fragments, in accordance with aspects described herein.
Figure 5C:
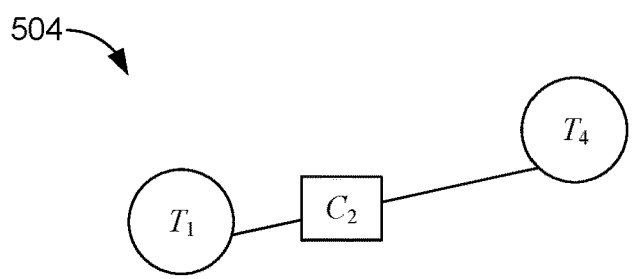
Figure 5D:
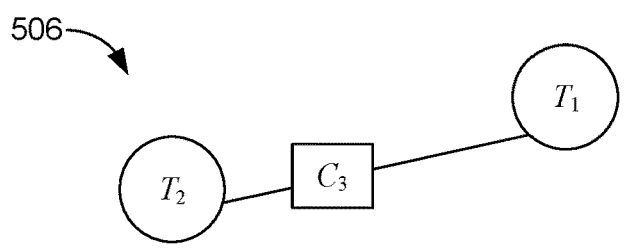

FIGS. 5B-5D illustrate some example join structure fragments that may be determined by join structure determiner 112 from third join structure 500. In the illustrated example, FIG. 5B comprises first join structure fragment 502, which is a single key join determined from at least a portion of the datasets within third join structure 500. First join structure fragment 502 is a single key join since $T_2$ is joined to $T_1$ at $C_1$ and also to $T_3$ at $C_1$.

FIG. 5C comprises second join structure fragment 504, which has also been determined by join structure determiner 112 from at least a portion of the datasets within third join structure 500. Here, second join structure fragment 504 comprises $T_1$ joined with $T_4$ at $C_2$. There is no centrally joined dataset, and $C_2$ is the only key. Thus, second join structure fragment 504 illustrates a single key join. Likewise, FIG. 5D also illustrates a single key join. Here, $T_2$ and $T_1$ are each joined by $C_3$. There is no centrally joined dataset, and only one key, $C_3$. Each of join structure fragment 504 and join structure fragment 506 are a particular type of single key join that comprises a table pair, e.g., a pair of datasets joined by one key.

Upon determining join structures within datasets of datasets 118, the determined join structures can be stored within database 106 as determined join structures 120 for later use by components of operating environment 100 and query engine 110. In some aspects, determined join structures 120 may also comprise join structure fragments identified from multiple key joins and associated with the multiple key joins stored in determined join structures 120.

Each of the join structures within determined join structures 120 can be associated with a query processing schema, stored as query processing schemas 122 in database 106. In general, query processing schemas 122 define the sampling techniques used to sample the datasets of a plurality of datasets in a join structure. In this way, when a join structure is identified from a join query, the query processing schema for that join structure can be selected to determine how to sample the databases determined from the join query.

When receiving the join query from computing device 104, query reconstructor 114 may be employed to reconstruct the join query so that the reconstructed join query can be used to derive the information requested by the join query. For instance, a join query may identify data or datasets for deriving information. When a join query identifies data, then query engine 110 may generally determine which dataset the identified data is included within, thereby also identifying the dataset from which to query and sample.

In general, query reconstructor 114 receives the join query and reconstructs the join query. The join query may be in the form of any database query language (DQL), such as SQL (Structured Query Language). The resulting reconstructed join query comprises query processing schema instructions that are used to derive the information from the database in accordance with a sampling technique. When the join query is received, query reconstructor 114 identifies the join structure using the join query. As noted, the join structures between datasets can be pre-determined or be determined in response to receiving the join query. The datasets identified by the join query are identified and the join structure may be determined based on how the datasets can be joined using join structure determiner 112, or how the join structure for the datasets identified by the join query can be accessed from determined join structures 120.

As noted, the join structure is identified based on the received join query. The join structure has an associated query processing schema that defines the sampling technique that is used to sample the databases to derive the information. Continuing with the previous example, if the join structure is a fact dimension join, the fact dimension join is associated with a first query processing schema that defines a first sampling technique for sampling the centrally joined dataset. If the join structure is a single key join, then the single key join is associated with a second query processing schema that defines a second sampling technique for sampling each database according to a determined sampling rate. If the join structure is a multiple key join, then the multiple key join is associated with a third query processing schema. The third sampling technique for the multiple key join includes identifying join structure fragments from the join structure of the multiple key join, where the join structure fragments include one or more single key joins. The single key joins are sampled according to the second sampling techniques, respectively.

To reconstruct the join query, query reconstructor 114 generates a reconstructed join query that includes query processing schema instructions. The query processing schema instructions are in the form of query elements, which comprise portions of the reconstructed join query that are in the DQL format for identifying or processing data within datasets. The reconstructed join query includes the identified datasets and query processing schema instructions for sampling the datasets in accordance with the sampling technique. This may include identifying a dataset and a sampling rate for the dataset. In some cases, the initial join query received from computing device 104 does not include the sampling technique, but rather, the sampling technique is determined after receiving the join query and the corresponding query processing schema instructions are then included in the reconstructed join query. In an aspect of the technology, the reconstructed join query further comprises confidence intervals that are computed to identify a confidence value for a sampled dataset, which may indicate errors associated with a sampled dataset.

When reconstructing the join query, one or more sampling rates for a dataset may be accessed to include in the reconstructed join query. That is, the sampling rate may be received as an input or determined. The sampling rates may be applied as query elements in the reconstructed query as instructions to sample a dataset as indicated by the sampling technique. For instance, for a fact dimension join, a sampling technique may be accessed and included within the reconstructed join query to sample the centrally joined dataset. For a single key join, one or more sampling rates may be accessed and included within the reconstructed join query to sample the datasets.

For a join structure that is a fact dimension join, a sampling rate may comprise a stratified sampling rate or a uniform sampling rate. To determine the stratified sampling rate, assume that the maximum number of rows (or other data arrangement element) allowed in the sample from a single strata is given as input. Let this number be K. In that event. The sampling rate for a strata with total number of rows L will be K/L. To determine a uniform sampling rate, use $$\frac{N_t}{N}$$

as the uniform sampling rate for the fact table (e.g., the centrally joined dataset). Here, N is the number of rows in the fact table and $N_t$ is the number of rows in a sample below which there is no significant reduction in latency.

In an aspect, the sample below which there is no significant reduction in latency generally means that if there are less than $N_t$ rows in a table, then overhead costs dominate the table scan cost. $N_t$ may be provided as input or to be determined experimentally by running queries on tables of different sizes.

To provide an example, let C be a column on which stratified sample is to be created. If C takes values $V_1$, $V_2$, ..., $V_r$, then all rows of the dataset in which C takes a certain value is a strata. For example, all rows of the dataset with C=$V_1$ is a strata. For stratified sample, one needs to specify the maximum number of rows from a certain strata. That number is K. The number of rows in a particular strata is L (say there are 1000 rows with C=$V_1$ and 500 rows with C=$V_2$ then for the first strata L is 1000 and for second it is 500). One may want that the number of rows from a strata in a sample is at most 100. Then for the C=$V_1$ strata, the sampling rate would be 100/1000=0.1 and for the C=$V_2$ strata, it would be 500/1000=0.5.

In general, a goal is to determine an approximate answer to provide in response to the join query. Thus, a reconstructed query may be run on tables comprising sampling rates instead of the original tables.

FIG. 6 and FIG. 7 illustrate a join query and the corresponding reconstructed join query for a fact dimension join, among other join structure examples. In FIG. 6, join query 602 comprises a join query that may be received from computing device 104. Join query 602 is determined to be a fact dimension join. Thus, query reconstructor 114 reconstructs join query 602 to generate reconstructed join query 604. In the reconstructed join query, the centrally joined dataset is being sampled according to the sampling rate SR, which is included as a query element in reconstructed join query 604. The sampling rate has been applied to the dataset S, which is the centrally joined dataset. With reference to FIG. 7, join query 702 corresponds to the same initial join query 602 for the fact dimension join. However, reconstructed join query 704 has been reconstructed to calculate the confidence interval from the sampling.

Continuing with FIG. 6 and FIG. 7, Fact is the fact (central) table, $Dim_1$, $Dim_2$, ..., are the dimension tables (non-central tables in a schema like FIG. 3). C is a column on which GROUP BY is to be done as specified in the query. In "WHERE c," c is just some WHERE condition (for example, c can be Fact.C'=Val, i.e., c here is that column C' of Fact table takes value Val).

As noted, query reconstructor 114 may determine that join query 604 is a fact dimension join (or another type of join). From the query, one finds the tables that are being joined, e.g., Fact, $Dim_1$, $Dim_2$. Then the schema (join graph) having these tables is found (e.g., is already stored), which determines the sampling method to use (in this example, the fact dimension join).

Another example of determining a reconstructed join query from a join query, where the reconstructed join query comprises a confidence interval follows:

"SELECT COUNT(*) AS
countEst, C FROM Fact
INNER JOIN Dim1 ON
Fact.C1=Dim1.C1 INNER JOIN
Dim2 ON Dim2.C2=Fact.C2
INNER JOIN . . . INNER JOIN
Dimn ON Dimn.Cj=Fact.Cj
WHERE c GROUP BY C;"

Using this example, the reconstructed join query (with confidence intervals) becomes:

"SELECT countEst, (countEst+2*SQRT(varCount)) AS countUB,
GREATEST(0, countEst−2*SQRT(varCount)) AS countLB, C FROM
(SELECT SUM(1/S.SR) AS countEst,
SUM((1−S.SR)/(S.SR*S.SR)) AS
varCount, C FROM S INNER JOIN Dim1
ON S.C1=Dim1.C1 INNER JOIN Dim2 ON
Dim2.C2=S.C2 INNER JOIN . . . INNER
JOIN Dimn ON Dimn.Cj=S.Cj WHERE c
GROUP BY C);"

The original query asks to compute COUNT(*) and output it as 'countEst', but the reconstructed query instead of running on 'Fact' table it runs on sample 'S' of this table, and computes an approximation of countEst as 'SUM(1/S.SR)' where SR is the column in sample 'S' in which sampling rate is specified. Since the above calculation of countEst is approximate, confidence intervals are also calculated in the above query, they are 'countLB' and 'countUB' i.e, it is likely that the actual output is in range [countLB, countUB]. countLB is computed as 'countEst−2*SQRT(varCount)' and countUB is computed as 'countEst+2*SQRT(varCount)' and 'varCount' is computed as 'SUM((1−S.SR)/(S.SR*S.SR))' Now, the computation method for 'countEst', 'countLB', and 'countUB' would be different for different sampling techniques as specified in FIG. 6 and FIG. 7.

Where the join query corresponds to a single key, join sampling rates may be determined based on the number of datasets in the single key join. For the case when pair of datasets joined with each other on the same join key, a universal Bernoulli sample is created for each dataset by determining an appropriate universal sampling rate or Bernoulli sampling rate. First, the optimal universal and Bernoulli sampling rates for each pair of datasets is calculated. Then, the final universal sampling rate for a dataset (e.g., table T) is calculated. The average of universal sampling rate over all the pairs having T as one table. The Bernoulli sampling rate for T would be its sampling budget divided by its universal sampling rate, wherein the sampling budget is received as an input. The sampling budget may be received as an input. For the case where there are more than two datasets in the single key join, say $T_1, \ldots, T_n$, the universal sample rate (USR) can be determined and included as a query element in the reconstructed join query.

A method to find the optimal universal and Bernoulli sampling rates for datasets is described in Dawei Huang, Dong Young Yoon, Seth Pettie, and Barzan Mozafari. "Join on samples: A theoretical guide for practitioners." *Proc. VLDB Endow.*, 13(4):547-560, 2019, which is hereby expressly incorporated by reference in its entirety.

Having this in mind, FIG. 6 illustrates an example of an initial join query 606 being reconstructed using query reconstructor 114 to reconstructed join query 608. If a query on the inner join of tables $T_1, \ldots, T_n$ is to be approximated using samples, the effective sampling rate of the join result is $S_1. SR*S_2*SR* \ldots *S_n. SR*\min(S_1. USR, \ldots, S_n. USR)$. Thus, in reconstructed join query 608, USR is the column name containing the universal sampling rate in a sample. FIG. 7 illustrates reconstructed join query 708 for join query 706. Reconstructed join query 708 includes a calculation for the confidence interval. S, again, is the dataset comprising the sampling rate SR, which may be the calculated Bernoulli sampling rate. To compute the variance for a query result for this case, we assume as if we have sampled a table $T_i$ with a uniform (or Bernoulli) sampling rate equal to its sampling budget.

When the join structure is a multiple key join, query reconstructor 114 may be employed to reconstruct the query to include the sampling rates for the various join structure fragments determined using join structure determiner 112. When any number of tables can be joined using multiple keys, a uniform sampling rate is determined.

In an aspect, the uniform sampling rate may be determined for each table. If the sampling rate for each table is given as input, the input can be used as the sampling rate. Otherwise, the sampling rate may be calculated for each table. Here, we use $$\frac{N_t}{|T|}$$

as the sampling rate for table T.

If a query on the join of tables $T_1, \ldots, T_n$ is to be approximated using uniform samples, the effective sampling rate of the join result is $S_1. SR*S_2*SR* \ldots *S_n. SR$. To illustrate, join query 610 of FIG. 6 is reconstructed in this manner by query reconstructor 114 to generate reconstructed join query 612. To compute the variance of a query result, we think of the join of uniform samples as a uniform sample of the true join result. The variance may be determined to reconstruct a join query so that the reconstructed join query further determines a confidence interval associated with the sampling. As illustrated in FIG. 7, join query 710 is reconstructed by query reconstructor 114 to provide reconstructed join query 712.

In some cases, the join structure fragments are pairs of tables determined from the join structure, e.g., there are two tables joined by a single key. Second join structure fragment 504 and third join structure fragment 506 are examples. The sampling budget for each table may be provided as input. Now, for a join key column C, a graph which is the join structure fragment of the join graph G is created and contains the edges labelled C. The nodes are removed with no incident edges from this join structure fragment. Such graphs are created for each key being used for inner joins in G.

If a node $T_i$ is part of l such join structure fragments, we assign a sampling budget of $$\frac{B_i}{l}$$

to $T_i$ in each of the l join structure fragments, where $B_i$ is the total sampling budget of $T_i$ as specified in the input. For each join structure fragment, datasets in the join structure fragment are sampled as specified in using the sampling technique for the single key join or the sampling technique for the fact dimension join. Now, table $T_i$ has l samples, and a join query is reconstructed to the appropriate sample depending on the join key in that query.

An example can be shown using FIGS. 5A-5D. Here, the sampling budget is calculated for each of $T_1$-$T_4$, respectively providing sampling budgets $B_1$-$B_4$. FIG. 5B illustrates first join structure fragment 502 that is a join structure fragment with respect to $C_1$. In this case, the sampling budget for $T_1$ is $B_1/3$. The sampling budget for $T_2$ is $B_2/2$. The sampling budget for $T_3$ is $B_3$. FIG. 5C illustrates second join structure fragment 504 that is a join structure fragment with respect to $C_2$. Here, the sampling budget for $T_1$ is $B_1/3$, while the sampling budget for $T_4$ is $B_4$. FIG. 5D illustrates third join structure fragment 506 that is another join structure fragment and is generated with respect to $C_3$. Here, the sampling budget for $T_1$ becomes $B_1/3$, and the sampling budget for $T_2$ becomes $B_2/2$.

FIG. 6 illustrates reconstruction of join query 610 using query reconstructor 114. Join query 610 is associated with a multiple key join. The SR query element for the sampling rate for each dataset, S, is determined from the sampling budget as described. Using this, join query 610 is reconstructed into reconstructed join query 612. For reconstructing the join query to include a determination of the confidence interval, the variance can be determined using methods described with respect to fact dimension joins and single key joins. The variance calculation may be also be included in the reconstructed join query. As illustrated in FIG. 7, join query 710 can be reconstructed by query reconstructor 114 in this manner to generate reconstructed join query 712.

Now having reconstructed the join query to generate a reconstructed join query, query executor 116 can derive the information requested by the initial join query. That is, server 102 may execute the query processing schema instructions provided in the reconstructed join query by the query elements to retrieve and derive information from database 106 in accordance with the reconstructed join query. In doing so, the sampling technique defined by the query processing schema that has been selected for a join structure samples the stored datasets to determine the information. The sampling is performed in accordance with the sampling technique determined based on the query processing schema.

The databases are sampled based on the reconstructed join query. The resulting derived information is then communicated back to computing device 104. This may be performed in response to receiving the initial join query from computing device 104.

Figure 8:
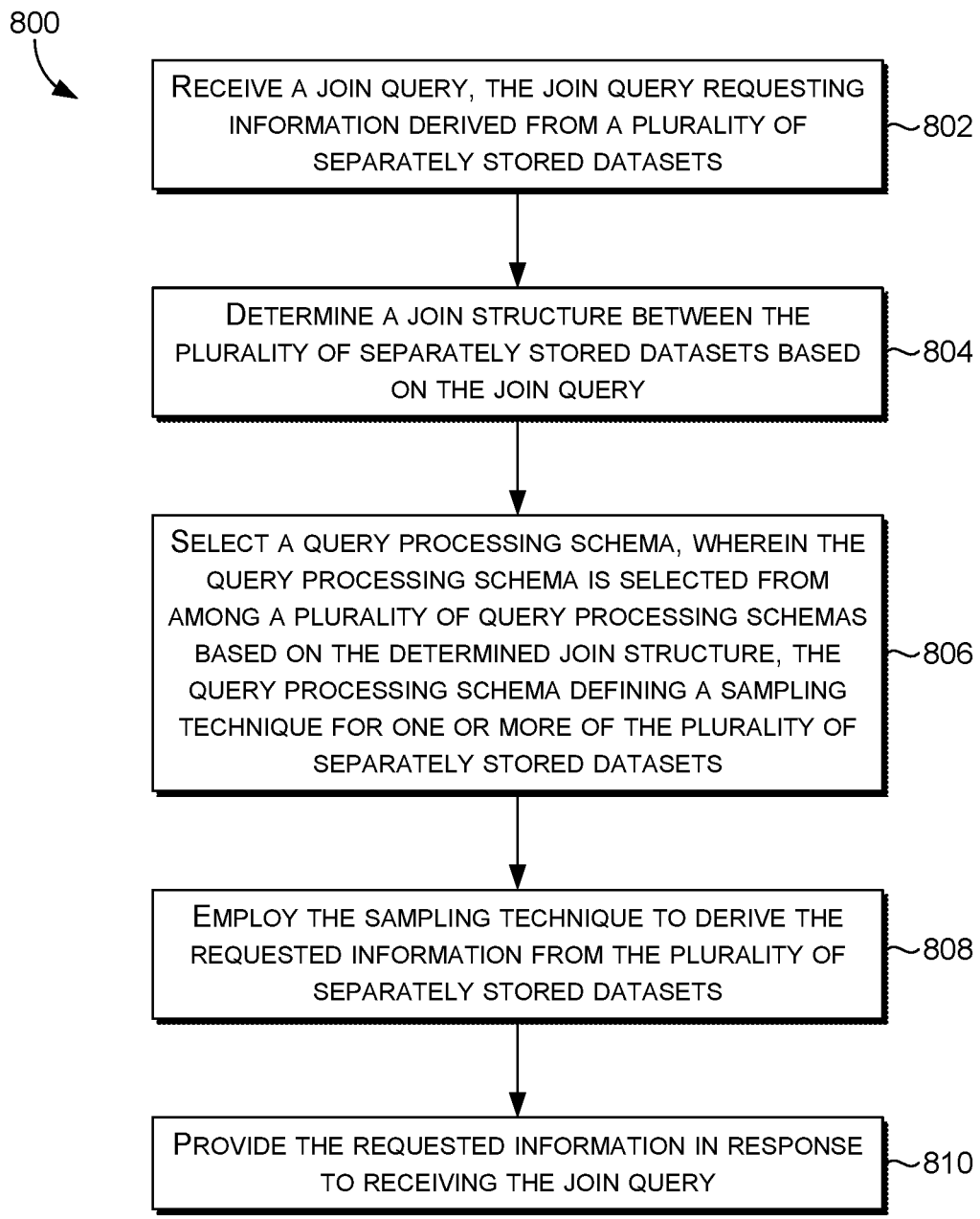
FIGS. 8-9 are block diagrams illustrating example methods for retrieving information from one or more databases, in accordance with aspects described herein.
Figure 9:
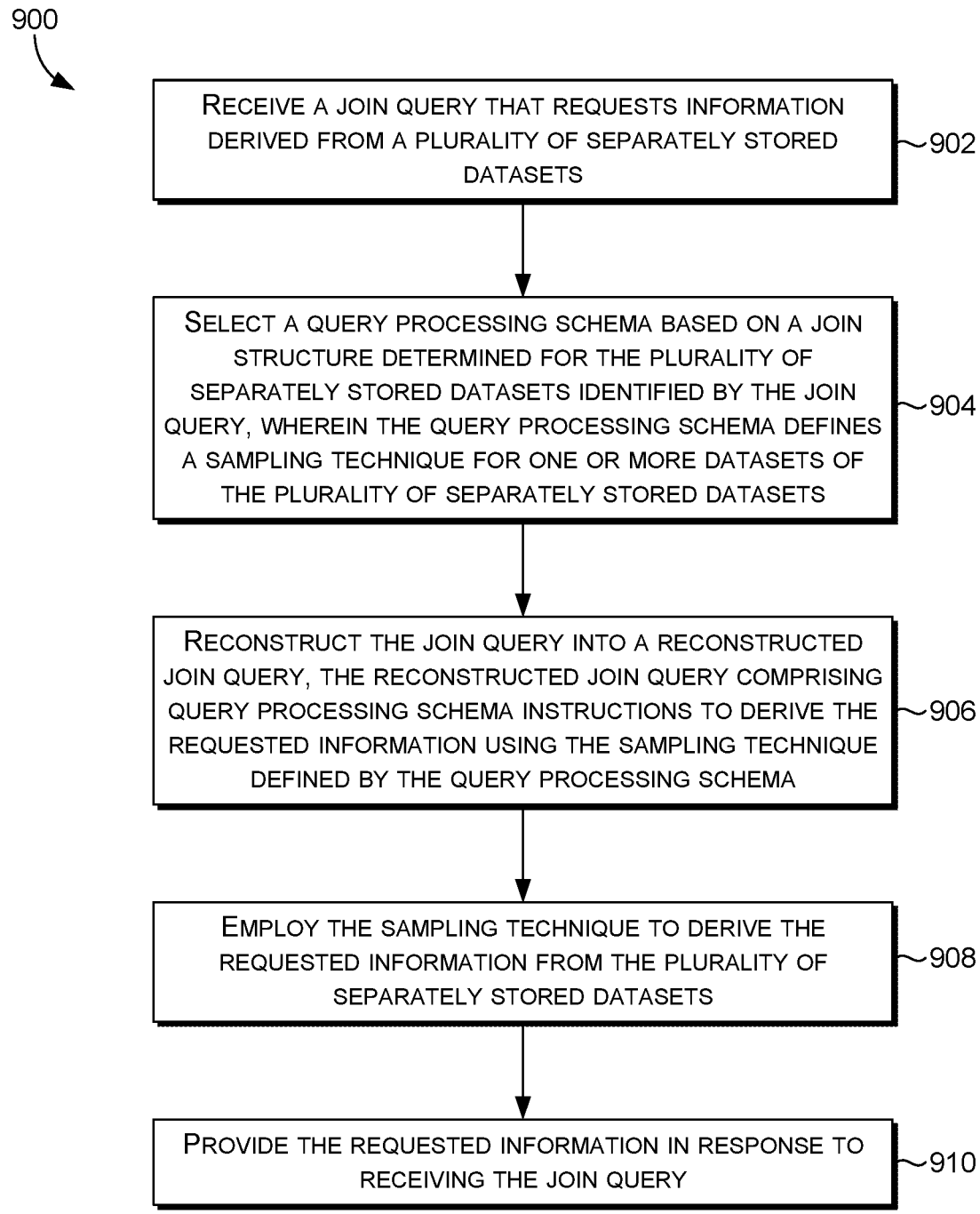
Figure 10:
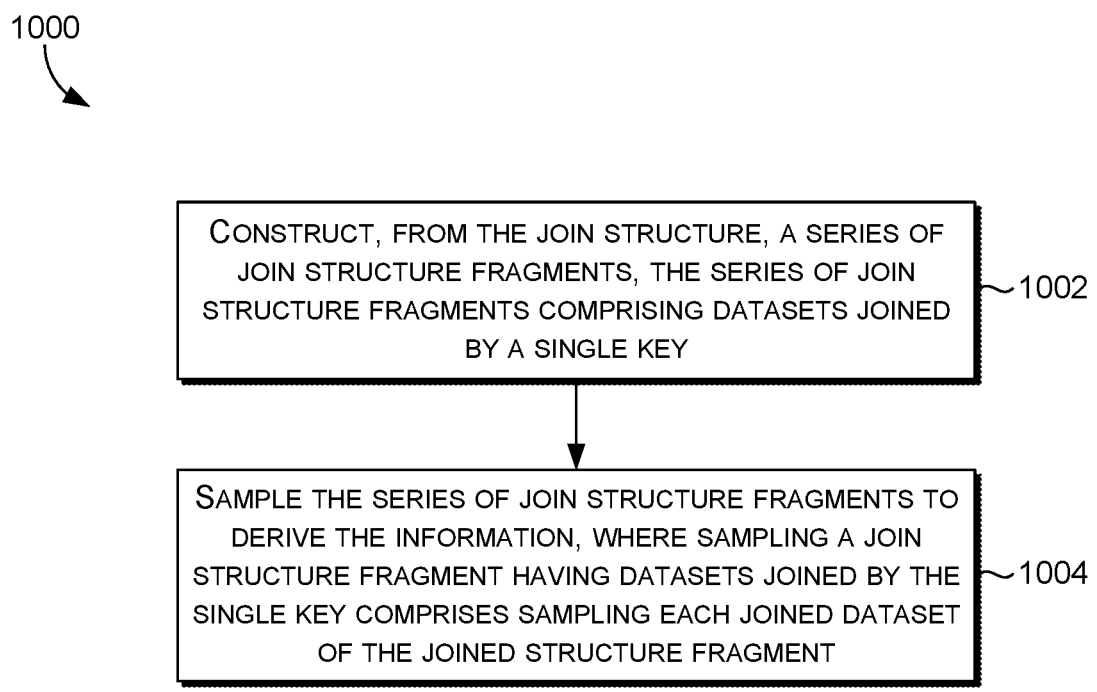
FIG. 10 is a block diagram illustrating an example method for sampling join structure fragments from one or more databases, in accordance with an aspect described herein.

With reference now to FIGS. 8-10, block diagrams are provided respectively illustrating methods 800, 900, and 1000 for retrieving information. Each block of methods 800, 900, and 1000, may comprise a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few possibilities. Methods 800, 900, and 1000 may be implemented in whole or in part by components of operating environment 100.

With specific reference to FIG. 8, an example method 800 is provided for retrieving information. At block 802, a join query is received. The join query may be received from a computing device, such as computing device 104, and request information derived from a plurality of separately stored datasets. The information may be derived based on the plurality of separately stored datasets being joined at one or more keys.

Join structures corresponding to how the plurality of datasets may be joined are determined and stored. The join structures are determined using join structure determiner 112. Some examples include fact dimension joins, single key joins, and multiple key joins. Each of the join structures is associated with a query processing schema. The query processing schema defines a sampling technique that has been determined for the join structure. The sampling technique indicates the datasets to be sampled how to sample the datasets.

At block 804, a join structure is determined for the plurality of separately stored datasets. The join structure may be determined by employing join structure determiner 112 to determine how the plurality of separately stored datasets can be joined according to the join query. In an aspect, the join structure is determined by identifying the join structure from the stored determined join structures. For instance, this can be done by identifying the datasets using the join query and selecting one or more join structures from the stored join structures having the identified datasets.

At block 806, a query processing schema is selected. As noted, each of the join structures may be associated with one or more query processing schemas. Thus, when the join structure is determined for the join query, the query processing schema associated with the join structure is selected. The query processing schema that is selected defines the sampling technique that is to be used on one or more of the datasets of the plurality of separately stored datasets.

At block 808, the sampling technique is employed to derive the requested information. This may be performed using query executor 116. That is, query executor 116 may retrieve and derive information by sampling the datasets according to the sampling technique. In an aspect, the join query is reconstructed by query reconstructor 114 to include query processing schema instructions that derive the requested information from the database. The query processing schema instructions include query elements that identify the datasets and the sampling rate for sampling the datasets of the plurality of separately stored datasets according to the sampling technique. The join query or the reconstructed join query may be in a database query language, such as a SQL query.

After deriving the requesting information from one or more databases at block 808, the requested information is provided. The requested information may be provided to computing device 104 from which the join query was received. The requested information is provided responsive to receiving the join query from computing device 104.

Turning now to FIG. 9, another example method 900 for deriving information is provided. At block 902, a join query is received. As with previous examples, the join query may be received from a computing device, such as computing device 104, and request information derived from a plurality of separately stored datasets. The information may be derived based on the plurality of separately stored datasets being joined at one or more keys.

As noted, join structures correspond to how the plurality of datasets may be joined are determined and stored. The join structures are determined using join structure determiner 112. Some examples include fact dimension joins, single key joins, and multiple key joins. Each of the join structures is associated with a query processing schema. The query processing schema defines a sampling technique that has been determined for the join structure. The sampling technique indicates the datasets to be sampled how to sample the datasets.

At block 904, a query processing schema is selected. The query processing schema may be selected based on the join structure. That is, the join structure is identified from the join query, for instance, by matching it with previously stored join structures or determining a join structure subsequent to receiving the join query using join structure determiner 112, using methods previously described.

At block 906, the join query is reconstructed to generate a reconstructed join query. The reconstruction may be performed by query reconstructor 114. Query reconstructor 114 generates the reconstructed join query by constructing a query in a database query language, such as SQL, using query elements that identify the datasets to be sampled and the sampling rates for those datasets, among other possible query elements.

At block 908, the sampling technique is employed to derive the requested information from the identified datasets using the reconstructed join query. Query executor 116 may be employed to retrieve the requested information by sampling one or more of the datasets according to the sampling technique associated with the selected query processing schema.

At block 910, the requested information derived at block 908 by employing the sampling technique using the reconstructed join query is provided. The requested information may be provided back to the computing device, such as 104, from which the join query was received, and can be done responsive to receiving the join query.

Referring now to FIG. 10, in some aspects, a join query may identify a multiple key join. The multiple key join may be associated with a query processing schema that defines a sampling technique whereby a series of join structure fragments is determined and the respective databases are sampled accordingly.

FIG. 10 provides a block diagram of an example method 1000 for sampling join structure fragments. At block 1002, a series of join structure fragments is constructed from a join structure. This may be done using join structure determiner 112. The series of join structure fragments maybe determined prior to receiving a join query and stored for reference. In another aspect, the join structure fragments are constructed after receiving a join query. The join structure fragments may be constructed so that each of the join structure fragments corresponds to one of another join structure type, such as a fact dimension join having a centrally joined dataset or a single key join having two or more datasets joined by a single key.

At block 1004, the series of joins structure fragments is sample to derive the requested information. The join structure fragments may be sampled by query executor 116 by employing a reconstructed join query having query processing schema instructions for one or more of the join structure fragments. Where the join structure fragment corresponds to a single key join, the datasets of the join structure fragment may each be sampled according to sampling rates determined for the dataset and included in the reconstructed join query as query elements.

Figure 11:
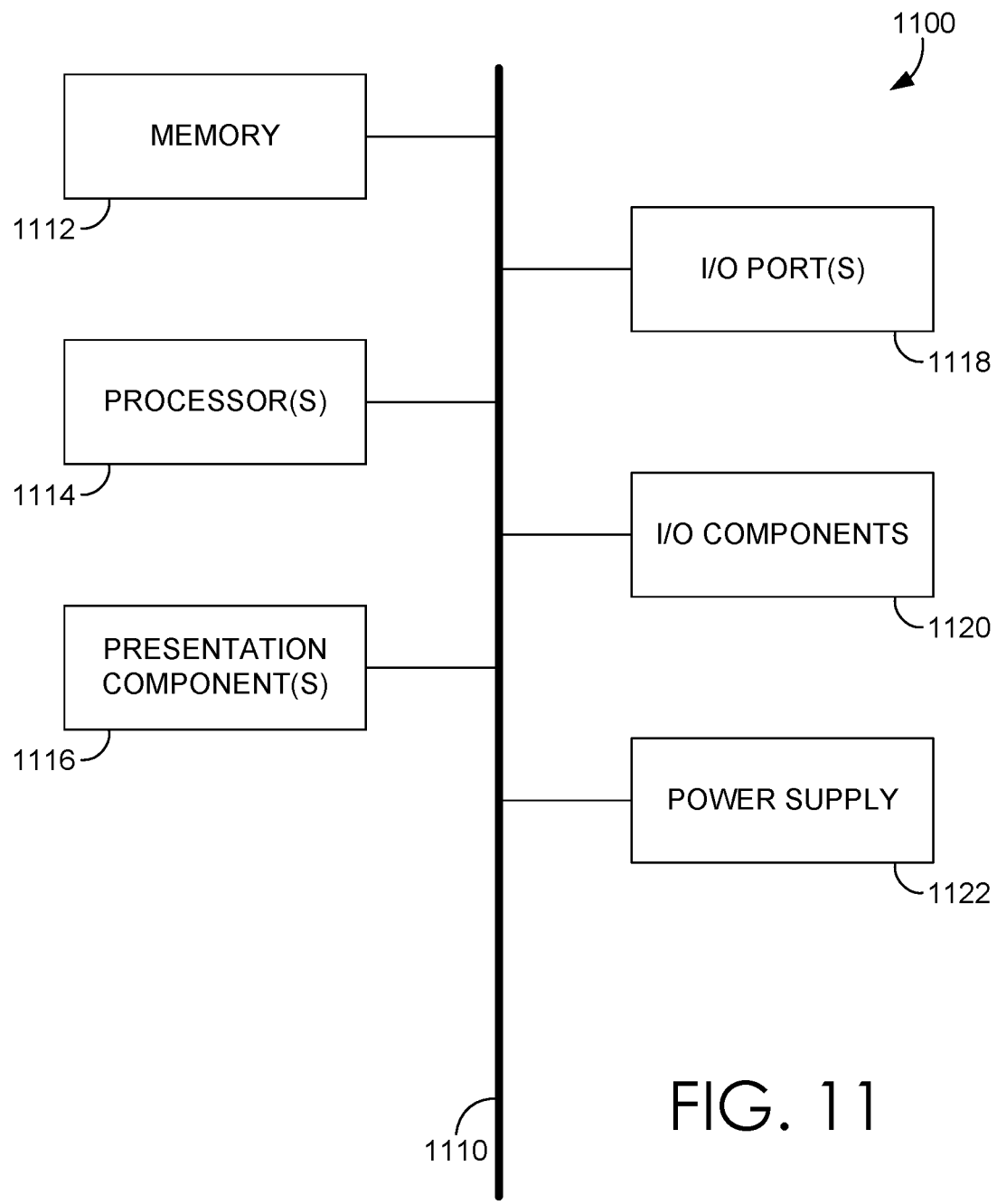
FIG. 11 illustrates an example computing device suitable for implementing aspects of the described technology, in accordance with an aspect described herein.

Having described an overview of some embodiments of the present technology, an example computing environment in which embodiments of the present technology may be implemented is described below in order to provide a general context for various aspects of the present technology. Referring now to FIG. 11, in particular, an example operating environment for implementing embodiments of the present technology is shown and designated generally as computing device 1100. Computing device 1100 is but one example of a suitable computing environment and is not intended to suggest any limitation as to the scope of use or functionality of the technology. Neither should computing device 1100 be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 11, computing device 1100 includes bus 1110 that directly or indirectly couples the following devices: memory 1112; one or more processors 1114; one or more presentation components 1116; input/output (I/O) ports 1118; input/output components 1120; and illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear and, metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 11 is merely illustrative of an example computing device that can be used in connection with one or more embodiments of the present technology. Distinction is not made between such categories as "workstation," "server," "laptop," "hand-held device," etc., as all are contemplated within the scope of FIG. 11 and with reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media, also referred to as a communication component, includes both volatile and nonvolatile, removable and non-removable media implemented in any method or technology for storage of information, such as computer-readable instructions, data structures, program modules, or other data. Computer storage media includes, but is not limited to, RAM; ROM; EEPROM; flash memory or other memory technology; CD-ROM; digital versatile disks (DVD) or other optical disk storage; magnetic cassettes; magnetic tape; magnetic disk storage or other magnetic storage devices; or any other medium which can be used to store the desired information and which can be accessed by computing device 1100. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1112 includes computer-storage media in the form of volatile or nonvolatile memory. The memory may be removable, non-removable, or a combination thereof. Example hardware devices include solid-state memory, hard drives, optical-disc drives, etc. Computing device 1100 includes one or more processors that read data from various entities, such as memory 1112 or I/O components 1120. Presentation component(s) 1116 present data indications to a user or other device. Example presentation components include a display device, speaker, printing component, vibrating component, etc.

I/O ports 1118 allow computing device 1100 to be logically coupled to other devices, including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1100. Computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of computing device 1100 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low level software written in machine code; higher level software, such as application software; and any combination thereof. In this regard, components for approximate query processing using joins can manage resources and provide the described functionality. Any other variations and combinations thereof are contemplated with embodiments of the present technology.

With reference briefly back to FIG. 1, it is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1, such as those described in relation to query engine 110, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory, such as database 106. Moreover, functions of query engine 110, among other functions, may be performed by server 102, computing device 104, or any other component, in any combination.

Referring to the drawings and description in general, having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment.

The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including," "having," and other like words have the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however the distributed computing environment depicted herein is merely an example. Components can be configured for performing novel aspects of embodiments, where the term "configured for" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. A system for retrieving information, the system comprising:
   at least one processor; and
   one or more computer storage media storing computer readable instructions thereon that when executed by the at least one processor cause the at least one processor to perform operations comprising:
   receiving a join query, the join query requesting information derived from a plurality of separately stored datasets;
   determining a join structure between the plurality of separately stored datasets based on the join query;
   selecting a query processing schema, wherein the query processing schema is selected from among a plurality of query processing schemas based on the determined join structure, the query processing schema defining a sampling technique for one or more of the plurality of separately stored datasets;
   reconstructing the join query based on the sampling technique of the selected query processing schema, thereby forming an executable reconstructed join query; and
   executing the reconstructed join query on the plurality of separately stored datasets, wherein the reconstructed join query retrieves the requested information in accordance with the sampling technique when executed.

2. The system of claim 1, wherein the reconstructed join query comprising query processing schema instructions to derive the requested information using the sampling technique defined by the query processing schema.

3. The system of claim 1, wherein the join structure comprises a centrally joined dataset, and the sampling technique defined by the query processing schema comprises sampling only the centrally joined dataset to derive the information.

4. The system of claim 1, wherein the join structure comprises datasets joined by a single key, and the sampling technique defined by the query processing schema comprises sampling each joined dataset to derive the information.

5. The system of claim 1, wherein the join structure comprises datasets joined by a plurality of keys, and the sampling technique defined by the query processing schema comprises:
   constructing, from the join structure, a series of join structure fragments, each join structure fragment of the series comprising datasets joined by a single key; and
   sampling the series of join structure fragments to derive the information, wherein sampling a join structure fragment having datasets joined by the single key comprises sampling each joined dataset of the joined structure fragment.

6. The system of claim 1, wherein the received join query is a SQL (Structured Query Language) query.

7. The system of claim 6, wherein query elements of the SQL query do not comprise the sampling technique.

8. A method performed by one or more processors for retrieving information, the method comprising:
   receiving a join query that requests information derived from a plurality of separately stored datasets;
   selecting a query processing schema based on a join structure determined for the plurality of separately stored datasets identified by the join query, wherein the query processing schema defines a sampling technique for one or more datasets of the plurality of separately stored datasets;
   reconstructing the join query based on the sampling technique of the selected query processing schema, thereby forming an executable reconstructed join query comprising query processing schema instructions to derive the requested information using the sampling technique;
   executing the reconstructed join query on the plurality of separately stored datasets, wherein the reconstructed join query retrieves the requested information in accordance with the sampling technique when executed; and providing the requested information in response to receiving the join query.

9. The method of claim 8, wherein the join structure comprises a centrally joined dataset, and the sampling technique defined by the query processing schema comprises sampling only the centrally joined dataset to derive the information.

10. The method of claim 8, wherein the join structure comprises datasets joined by a single key, and the sampling technique defined by the query processing schema comprises sampling each joined dataset to derive the information.

11. The method of claim 8, wherein the join structure comprises datasets joined by a plurality of keys, and the sampling technique defined by the query processing schema comprises:
- constructing, from the join structure, a series of join structure fragments, each join structure fragment of the series comprises datasets joined by a single key; and
- sampling the series of join structure fragments to derive the information, wherein sampling a join structure fragment having datasets joined by the single key comprises sampling each joined dataset of the joined structure fragment.

12. The method of claim 8, wherein the received join query is a SQL (Structured Query Language) query.

13. The method of claim 12, wherein query elements of the SQL query do not comprise the sampling technique, and the query processing schema instructions of the reconstructed join query define the sampling technique.

14. One or more computer storage media storing computer readable instructions thereon that, when executed by a processor, cause the processor to perform a method for retrieving information, the method comprising:
- receiving a join query that requests information derived from at least a portion of a plurality of separately stored datasets;
- reconstructing the join query into a reconstructed join query, the reconstructed join query comprising query processing schema instructions to derive the requested information using a sampling technique defined by the query processing schema, the query processing schema determined based on a join structure determined for the portion of plurality of separately stored datasets; and
- executing the reconstructed join query on the portion of the plurality of separately stored datasets, wherein the reconstructed join query retrieves the requested information in accordance with the sampling technique when executed.

15. The method of claim 14, further comprising:
- identifying a plurality of join structures within the plurality of separately stored datasets based on keys between the plurality of separately stored datasets, each join structure of the plurality having a corresponding query processing schema; and
- determining the join structure based on the portion of the plurality of separately stored datasets identified by the join query, wherein the query processing schema is determined by selecting the query processing schema corresponding to the determined join structure.

16. The method of claim 14, wherein the join structure comprises a centrally joined dataset, and the sampling technique defined by the query processing schema comprises sampling only the centrally joined dataset to derive the information.

17. The method of claim 14, wherein the join structure comprises datasets joined by a single key, and the sampling technique defined by the query processing schema comprises sampling each joined dataset to derive the information.

18. The method of claim 14, wherein the join structure comprises datasets joined by a plurality of keys, and the sampling technique defined by the query processing schema comprises:
- constructing, from the join structure, a series of join structure fragments, each join structure fragment of the series comprises datasets joined by a single key; and
- sampling the series of join structure fragments to derive the information, wherein sampling a join structure fragment having datasets joined by the single key comprises sampling each joined dataset of the joined structure fragment.

19. The method of claim 14, wherein the received join query is a SQL (Structured Query Language) query.

20. The method of claim 19, wherein query elements of the SQL query do not comprise the sampling technique, and the query processing schema instructions of the reconstructed join query define the sampling technique.

* * * * *